United States Patent
Yan et al.

(10) Patent No.: US 10,701,216 B2
(45) Date of Patent: Jun. 30, 2020

(54) METHODS AND DEVICES FOR TIME-BASED CONDITIONAL PRESENCE REPORTING

(71) Applicant: Verizon Patent and Licensing Inc., Arlington, VA (US)

(72) Inventors: Lixia Yan, Basking Ridge, NJ (US); Marc Jason Chiaverini, Randolph, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 21 days.

(21) Appl. No.: 16/158,577

(22) Filed: Oct. 12, 2018

(65) Prior Publication Data
US 2020/0120214 A1 Apr. 16, 2020

(51) Int. Cl.
  *H04M 15/00* (2006.01)
  *H04W 76/12* (2018.01)
  *H04W 8/08* (2009.01)
  *H04W 4/24* (2018.01)

(52) U.S. Cl.
  CPC ............ *H04M 15/66* (2013.01); *H04W 4/24* (2013.01); *H04W 8/08* (2013.01); *H04W 76/12* (2018.02)

(58) Field of Classification Search
None
See application file for complete search history.

(56) References Cited

U.S. PATENT DOCUMENTS

| | | | |
|---|---|---|---|
| 2009/0036142 A1* | 2/2009 | Yan | H04W 60/00 455/456.1 |
| 2010/0248691 A1* | 9/2010 | Lindner | H04L 63/102 455/411 |
| 2011/0294506 A1* | 12/2011 | Claussen | H04W 8/10 455/435.1 |
| 2012/0039175 A1* | 2/2012 | Sridhar | H04L 47/125 370/236 |
| 2012/0059729 A1* | 3/2012 | Roa | G06Q 30/02 705/26.1 |
| 2012/0149396 A1* | 6/2012 | Fan | H04W 4/021 455/456.3 |
| 2013/0051331 A1* | 2/2013 | Bao | H04W 28/24 370/329 |
| 2014/0379431 A1* | 12/2014 | Kritt | H04W 4/029 705/7.34 |
| 2015/0071125 A1* | 3/2015 | Wang | H04L 12/1407 370/259 |
| 2015/0382242 A1* | 12/2015 | Sunavala | H04W 24/02 370/254 |
| 2016/0021173 A1* | 1/2016 | Tapia | H04L 67/125 709/204 |

(Continued)

Primary Examiner — Chi H Pham
Assistant Examiner — Vladislav Y Agureyev

(57) ABSTRACT

A device obtains and stores presence reporting area (PRA) data, including an area identifier, an event start time, and an event end time. The device receives, at a first point in time, an indication that a user device is present in an area identified by the area identifier. The device determines whether the first point in time is at or between the event start time and the event end time, and selectively reports a presence of the user device in the area based on a result of determining whether the first point in time is at or between the event start time and the event end time.

20 Claims, 11 Drawing Sheets

(56) References Cited

U.S. PATENT DOCUMENTS

| | | | | |
|---|---|---|---|---|
| 2016/0127943 A1* | 5/2016 | Shaw | ............... | H04W 28/0231 |
| | | | | 370/230 |
| 2016/0135016 A1* | 5/2016 | Zou | ....................... | H04W 4/06 |
| | | | | 370/312 |
| 2017/0161784 A1* | 6/2017 | Malik | ................ | G06Q 30/0261 |
| 2017/0164378 A1* | 6/2017 | Gunasekara | .......... | H04W 72/10 |
| 2017/0178193 A1* | 6/2017 | Jagannath | .......... | G06Q 30/0276 |
| 2017/0245106 A1* | 8/2017 | Connelly | ............ | H04L 65/4076 |
| 2018/0040038 A1* | 2/2018 | Vanslette | ........... | G06Q 30/0281 |

\* cited by examiner

METHODS AND DEVICES FOR TIME-BASED CONDITIONAL PRESENCE REPORTING

BACKGROUND

Wireless standards may (e.g., 3rd Generation Partnership Project (3GPP) define a mechanism for reporting the location of user equipment (UE), having cell level granularity, for use in policy control and charging scenarios. The mechanism includes reporting instances of a UE entering and leaving a presence reporting area (PRA), to a policy and charging entity, for use in adjusting one or more policy and/or charging rules applied to UE communication sessions based on the UE's presence in the PRA.

DETAILED DESCRIPTION OF PREFERRED EMBODIMENTS

Figure 1A:
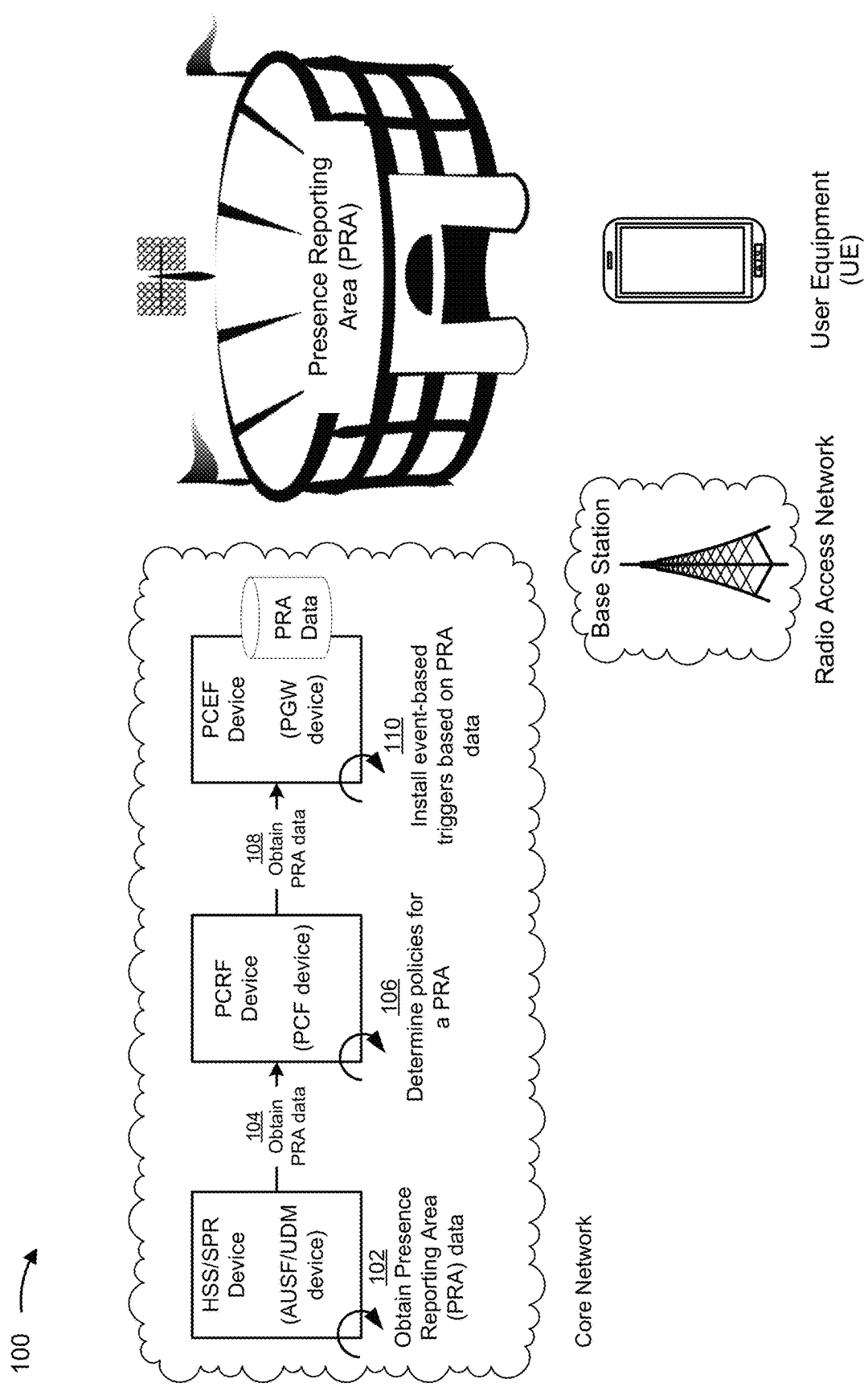
FIGS. 1A-1F are diagrams of an example implementation described herein.

The following detailed description of example implementations refers to the accompanying drawings. The same reference numbers in different drawings may identify the same or similar elements.

The 3rd Generation Partnership Project (3GPP) established a mechanism by which service providers (e.g., wireless service providers, mobile network operators, and/or the like) may provide location-specific policies for user equipment (UE) located within specific presence reporting areas (PRAs). Such location-specific policies may be used to manage quality of service (QoS) for UE communications that occur in densely populated (e.g., busy) areas, manage QoS for UE communications that occur in residential areas, facilitate provision of location-based services, and/or the like. According to this mechanism, when a subscriber's UE enters what is perceived as a busy area identified as a PRA (e.g., a stadium, an arena, a theme park, a mall, and/or the like), the subscriber's presence may be automatically reported to a Policy and Charging Rules Function (PCRF) device, which may trigger application of a location-specific policy to adjust a QoS for the subscriber. The location-specific policy may remain in effect until the subscriber's UE leaves the PRA.

In this case, application of the location-specific policy may adjust the QoS for all subscribers present in a specific PRA, regardless of a time and/or conditions at which the subscribers are present in the specific PRA. Such policy decisions, based on detecting a UE entering or leaving a PRA alone, fail to consider whether a subscriber is merely passing through the PRA (e.g., driving proximate to a stadium, at a stadium when no event is scheduled, etc.), whether the subscriber is present in the PRA during a non-busy time, and/or the like. Rather, the application of existing location-specific policies becomes triggered by the mere presence of a subscriber's UE in a PRA. As an example, a location-specific policy, triggered by detecting the presence of a UE in a PRA covering a football stadium, may reduce the QoS for UE communications sessions at all times, including non-game times. The reduction of service at all times may unnecessarily degrade the UE's performance, degrade the network's performance, waste resources used to throttle or control QoS for a large number of UEs for prolonged periods of time (e.g., periods of time that may be longer than may be necessary), a subscriber's customer experience, reduce the subscriber's sentiment and/or opinion of a service provider, reduce the subscriber's loyalty to the service provider, and/or the like.

Some implementations described herein include methods and devices for facilitating time-based, conditional reporting of a UE's presence in a PRA, whereby policy decisions may be generated and/or applied based on time data, in addition to location data associated with the UE entering and/or leaving the PRA. For example, some implementations described herein employ a Policy and Charging Enforcement Function (PCEF) device that obtains PRA data, including, for example, an area identifier (e.g., a PRA identifier), an event start time (e.g., as measured by one or more of an hour, a minute, a second, an associated time zone, and/or the like), an event end time, and/or the like, and selectively reports a UE's presence to a PCRF device based on a result of determining whether the UE is present in the PRA at a point in time at or between the event start time and the event end time. In this way, the application of location-specific policies and/or charging rules may be conditioned on time (e.g., the event start time, the event end time, and/or the like) and/or time data. In this way, network resources (e.g., signaling devices, routers, switches, gateways, wired or wireless connections, and/or the like) that would otherwise be wasted in automatically reporting, to the PCRF device, the UE's presence in a PRA may be reduced, minimized, and/or conserved. Further, in this way, computing resources (e.g., processors, memories, and/or the like) that would otherwise be wasted in automatically installing and applying policies based on the mere presence of a UE in a PRA may be reduced, minimized, and/or conserved. In this way, network devices and/or network resources may be more effectively managed.

FIGS. 1A-1F are diagrams of an example implementation 100 described herein. As shown in FIGS. 1A-1F implementation 100 may include a UE, a PRA, a radio access network, and a core network. The radio access network may include, for example, one or more base stations associated with one or more cells, as described herein. The core network may include, for example, a Home Subscriber Server (HSS)/Subscription Profile Repository (SPR) device, a PCRF device, a PCEF device, a Mobility Management Entity (MME) device, a Serving Gateway (SGW) device, and/or the like, as described herein. In some implementations, the UE, the radio access network, and the core network may be included in a mobile network, such as a third generation (3G) mobile network, a fourth generation (4G) mobile network, a fifth generation (5G) mobile network, and/or the like.

As a specific example, implementation 100 may include the UE, the PRA, and a 5G mobile network including the radio access network and the core network. In this example, one or more network function (NF) devices may implement the functionality provided by the HSS/SPR device, the PCRF device, the PCEF device, the MME device, and/or the SGW device, and/or the like. Such devices may be indicated in parenthesis in FIGS. 1A-1F, for illustration purposes only. For example, and in an example 5G network, an Authentication Server Function (AUSF) device/User Data Management (UDM) device may provide HSS/SPR device functionality, a Policy Control Function (PCF) device may provide PCRF device functionality, a Packet Data Network Gateway (PGW) device may provide PCEF device functionality, and/or a Session Management Function (SMF) device/User Plane Function (UPF) device may provide SGW device functionality, as described herein.

The radio access network may include one or more base stations, (e.g., a first base station, a second base station, a microcell base station, a picocell base station, and/or the like). In some implementations, each base station may be associated with a cell in the radio access network (e.g., a first base station may be associated with a first cell, a second base station may be associated with a second cell, and/or the like). For example, each base station may provide a portion of the coverage area within the cell in the radio access network. As a UE traverses from one cell to another cell, the UE may be handed off from one base station to another base station, so that continuity of service for the UE may be maintained during the handover.

In some implementations, the location of the UE may be tracked by obtaining location data for UE locations relative to a cell (e.g., including a cell identifier, such as a cell global identity (CGI), an E-UTRAN cell global identifier (ECGI), and/or the like), a base station (e.g., including a base station identifier, such as a Macro eNodeB identifier, a Home eNodeB identifier, and/or the like), a tracking area (e.g., formed by one or more cells, one or more base stations, and/or the like, including a same tracking area identifier (TAI), a same tracking area code (TAC), and/or the like), a service area (e.g., formed by one or more cells, one or more base stations, and/or the like, including a same location area identifier (LAI), a same location area code (LAC), and/or the like), a routing area (e.g., formed by one or more cells, one or more base stations, and/or the like including a same LAC and a same routing area code (RAC)), and/or the like.

In some implementations, the location of the UE may be tracked (e.g., maintained and updated) by a MME device as described herein, and location data (e.g., world geodetic system (WGS) coordinates associated with the UE's geographical location, coordinates associated with the UE's geographical location expressed in another coordinate system, data identifying a cell identifier associated with a cell in which the UE is located, data identifying a base station identifier associated with a base station to which the UE is communicatively connected, data identifying a TAC, data identifying a LAC, data identifying a RAC, and/or the like), associated with the UE, may be used to determine the UE entering or leaving a PRA. For example, in some implementations, a PRA may be associated with an area identifier, including one or more of a cell identifier, a base station identifier, a TAC, a LAC, a RAC, and/or the like. The UE may be deemed present (e.g., located or disposed) in the PRA based on a result of comparing the area identifier (e.g., associated with the PRA) and the location data (e.g., associated with the UE).

As described herein, one or more policy and/or charging rules may be selectively applied to a communication session for a UE, when the UE enters or leaves the PRA during, between, and/or within a predetermined time period, for example, a predetermined time period as defined by a start time and an end time. In some implementations, timestamp information, or other time data, obtained while tracking the UE location may be used in determining the time at which the UE enters and/or leaves the PRA. In this way, location and time-based policy and/or charging rules may be selectively applied to UEs present in a PRA at a specific (e.g., a predetermined) time. For example, a location and time-based policy and/or charging rule may be selectively applied to a UE that is present in a busy area (e.g., a PRA corresponding to a stadium), during a busy time (e.g., at or between a start time and an end time for a professional sporting event, and/or the like). In this way, the policy and/or charging rules for a communication session associated with a UE may not be interrupted based on the mere presence of the UE in a PRA alone. In this way, a subscriber's customer satisfaction and/or sentiment towards a service provider may improve.

The core network may include various network devices, such as the HSS/SPR device (e.g., or AUSF/UDM device), the PCRF device (e.g., or PCF device), the PCEF device (e.g., or PGW device), the SGW device (e.g., or SMF/UPF device), the MME device (e.g., or the AMF device), and/or the like. The HSS/SPR device may maintain subscriber profile data and/or policy data. In some implementations, the HSS/SPR device may obtain PRA data (e.g., be dynamically provisioned with PRA data, statically provisioned with PRA data, obtain PRA data from a data structure, and/or the like), which may be obtained by the PCRF device during an initial session setup, as described herein. The PRA data may include at least the area identifier (e.g., a PRA identifier that includes and/or is associated with a cell identifier, a base station identifier, a TAI, a TAC, a RAC, a LAC, and/or the like as described above), a start time (e.g., corresponding to a start time of an event, and/or the like), an end time (e.g., corresponding to an end time of an event, and/or the like), and/or the like, as described herein. Although some implementations set forth herein may depict a network node including both HSS/SPR functionalities, it shall be understood that in some implementations only a SPR device having SPR functionality may be provided, only a HSS device having HSS functionality may be provided, and/or the like.

In some implementations, the PCRF device may obtain the PRA data, generate one or more policy and/or charging rules, and associate the one or more policy and/or charging rules with the PRA data. For example, the PCRF device may associate one or more policy and/or charging rules with a combination of an area identifier, a start time, and an end time included in the PRA data. The PCRF device may store the associations between the policy and/or charging rules and the PRA data in a data structure associated with the PCRF device and/or another device included in the core network. In some implementations, the associations between the policy and/or charging rules and the PRA data may be deleted from the data structure upon termination of the end time. In this way, storage resources (e.g., memory, and/or the like) associated with the PCRF device may be conserved. As an example, the PCRF device may associate PRA data, including an area identifier (e.g., a cell identifier including or covering the MetLife Stadium), an event start time (e.g., 6:00:00 PM, EST), and an event end time (e.g., 11:00:00 PM, EST), with a QoS rule that specifies a limit to an amount of bandwidth the UE is allowed to use (e.g., 3 megabits per second, 4 megabits per second, and/or the like) when the UE is present in the PRA (e.g., MetLife Stadium) at or between 6:00:00 PM, EST and 11:00:00 PM, EST. In this way, the available bandwidth may be more evenly spread across a large quantity of UEs that may be present in the PRA, during the specified time period.

In some implementations, the PCEF device may obtain the PRA data by way of a PRA attribute value pair (AVP) and generate an event-based reporting trigger, whereby the PCEF device may selectively report the presence of the UE in the PRA, during the predetermined time period, to dynamically and/or automatically obtain a new and/or temporary policy and/or charging rule to be selectively applied to communications sessions associated with the UE, while the UE is in the PRA, during the predetermined time. In this way, when the UE is located in a particular PRA at a particular time, as determined by the PCEF device, the PCEF device may automatically report the UE's presence to the PCRF device, obtain the new policy and/or charging rules from the PCRF device, and/or apply the new policy and/or charging rules to communications sessions associated with the UE. The PCEF device may terminate implementation of the one or more new policy and/or charging rules applied to the communications sessions based upon the occurrence of an event, such as an expiration of the end time specified in the PRA data, the UE leaving the PRA, and/or the like. As an example, the PCEF device may selectively report the presence of a UE in a PRA, and the PCRF device may in turn transmit a policy rule to the PCEF device, which, when applied by the PCEF device, may limit or decrease a QoS parameter (e.g., bandwidth, a throughput, a bit rate, a priority, and/or the like), limit or decrease a usage quota, and/or the like, for a communications sessions associated with the UE. Additionally, or alternatively, the PCRF device may transmit policy rules based on additional events or triggers (e.g., in addition to receiving a presence report from the PCEF device), as described herein. As described further below, and in some implementations, the PCEF device may additionally, or alternatively, selectively report a UE's presence in a PRA, at a point in time at or between the start time and the end time, to an online charging system (OCS) device, for implementing conditional, location and time-based charging rules that modify quota (e.g., time and/or volume quotas) for communications sessions associated with the UE present in the PRA during the predetermined time period.

In some implementations, the PCRF device may transmit the new policy and/or charging rule, to the PCEF device, based on receiving a presence based report (e.g., a report of the presence of the UE), from the PCEF device, in addition to determining satisfaction of one or more additional, or alternative conditions, receiving one or more additional, or alternative triggers, and/or the like. For example, the PCRF device may transmit the new policy and/or charging rule, to the PCEF device) based on receiving the presence report, from the PCEF device, in addition to determining that a number of UEs in the PRA satisfies a threshold. In this way, the new policy and/or charging rule may be applied to communications sessions associated with one or more UEs based on location, time, and/or the number of UEs present in the PRA. In this way, communications sessions associated with the one or more UEs may be adjusted when a larger number of UEs are present in the PRA. Similarly, and in some implementations, the PCRF device may transmit the new policy and/or charging rule, to the PCEF device, based on receiving the presence report, from the PCEF device, in addition to determining that a signal-to-noise-plus-interference ratio (SNIR) satisfies a threshold, determining that a network congestion metric satisfies a threshold, determining that a load for a network device satisfies a threshold, and/or the like.

In some implementations, the SGW device may provide the UE access to one or more networks that are communicatively connected to the mobile network. For example, the SGW device may receive traffic, from the UE, transmitted during communications sessions associated with the UE, and may forward the traffic to another network device included in the mobile network, to another network device included in another mobile network, and/or the like. Similarly, the SGW device may receive traffic from another entity, transmitted during the communications sessions associated with the UE, and may forward the traffic to the UE by way of a base station included in the mobile network. In some implementations, the SGW device may route traffic between the MME device and the PCEF device, including traffic communicating PRA data.

In some implementations, the MME device may be configured to provide mobility management functionality for the UE in the mobile network. For example, the MME may obtain and manage PRA lists (e.g., managing lists of PRAs, lists of PRA data, and/or the like), obtain and manage UE tracking data, manage bearer activation and deactivation, provide SGW device selection, provide authentication services, and/or the like, as described herein. In some implementations, the MME device may additionally obtain and store initial location data associated with the UE upon attachment to the core network, such as information identifying a geographical location of the UE (e.g., a cell identifier associated with the UE, a base station identifier associated with the UE, and/or the like), and update the initial location data based on an occurrence of an event, such as receiving a tracking area update report from the UE, a handover of the UE from one base station to another base station included in the mobile network, movement of the UE from one cell to another cell included in the mobile network, the UE communicatively connecting to the mobile network, the UE disconnecting from the mobile network, and/or the like.

To illustrate the above, and turning to FIG. 1A, as shown by reference number 102, the HSS/SPR device (e.g., or AUSF/UDM device) may obtain PRA data. In some implementations, the HSS/SPR device may be dynamically provisioned with the PRA data, statically provisioned with the PRA data, access a data structure containing pre-configured PRA data, access a database containing the PRA data, receive the PRA data by way of an application programming interface (API) call, and/or the like. In some implementations, the PRA data may be obtained from and/or provided by a service provider. Additionally, or alternatively, in some implementations, the PRA data may be obtained by another network device in the core network, which may be separate from the HSS/SPR device, such as the MME device, the PCRF device, the PCEF device, the SGW device, and/or the like. The PRA data may be associated with one or more specific UEs, one or more network devices (e.g., specific gateways, specific base stations, and/or the like, in a mobile network), and/or the like. In some implementations, the PRA data may be associated with an event, such as a sporting event, a concert, and/or the like, as described herein.

In some implementations, the PRA data may be provided as a PRA list, which may include a list of one or more PRAs, identified by one or more area identifiers, and time data for which UE presence is to be reported. The area identifiers may be associated with time data that includes at least a start time and an end time defining a predetermined time period. As an example, the time data may include start and end times associated with an event (e.g., a concert start/end times, a sporting event start/end times, a parade start/end times, and/or the like). Any other information, not inconsistent with the instant disclosure, may be provided as PRA data, for use in generating location and time-based policies for UEs that enter and/or leave a PRA during the predetermined time period, as described herein.

In some implementations, a core network predefined PRA list may be obtained by the HSS/SPR device and/or other network device in the core network. The core-network predefined PRA list may include a list of at least one or more PRA area identifiers, start times, and end times used in creating location and time-based policies that apply to all or a subset of the UEs in a mobile network. For example, the core-network predefined PRA list may include a unique PRA list identifier (e.g., a list name, and/or the like), an optional free-text description of the PRA list, and/or a unique numeric identifier associated with the PRA list, by which the core-network predefined list may be obtained from a predefined data structure accessible to the HSS/SPR device and/or other network device in the core network. In some implementations, a UE-dedicated PRA list may be obtained by the HSS/SPR device and/or other network device in the core network. The UE-dedicated PRA list may be used to create location and time-specific policies that apply to a single UE, or a group of multiple UEs, in a mobile network. In some implementations, each entry contained in a PRA list may include a PRA identifier (i.e., an area identifier), a type of PRA list (e.g., core-network predefined, UE-dedicated), a start time, and an end time.

In some implementations, the area identifier associated with a PRA may include a TAI, which may be associated with a mobile country code (MCC) comprised of one or more numeric digits, a mobile network code (MNC) comprised of one or more numeric digits, and/or a TAC comprised of a decimal number. In some implementations, the area identifier for a PRA may include a routing area identifier (RAI), which may be associated with a MCC, a MNC, a LAC, and/or a RAC. In some implementations, the area identifier for a PRA may include a service area identifier (SAI), which may be associated with a MCC, a MNC, a LAC, and/or a service area code. In some implementations, the area identifier for a PRA may include a Macro eNodeB identifier, a Home eNodeB identifier, a cell identifier, a service set identifier (SSID) associated with a wireless local area network (WLAN) access point, a media access control (MAC) address associated with a WLAN access point, and/or the like. In some implementations, any identifier which may be resolved into a geographical location and/or broadcast by a base station, may be used as an area identifier for a PRA and/or received as location data for a UE, as described herein. Further, in some implementations, a PRA may include a single area identifier (e.g., for identifying a specific geographical location) or multiple area identifiers (e.g., for identifying a larger geographical area).

As further shown by FIG. 1A, and by reference number 104, the PCRF device (e.g., or PCF device) may obtain the PRA data. In some implementations, the PCRF device may obtain the PRA data from the HSS/SPR device during an initial session setup, such as an initial IP-CAN session setup. For example, the PCRF device may obtain the PRA data by way of transmitting a User-Data-Request (UDR) command to the HSS/SPR device requesting the PRA data. In turn, the HSS/SPR device may transmit the PRA data to the PCRF device by way of a User-Data-Answer (UDA) command including the PRA data. In some implementations, the PCRF device may obtain the PRA data using any wired or wireless connection, interface, and/or the like.

As further shown by FIG. 1A, and by reference number 106, the PCRF device may determine one or more policies (e.g., including one or more policy and/or charging rules) to associate with a PRA and/or the PRA data associated with a PRA. In some implementations, the policies may be determined based on information associated with the PRA data. For example, the PCRF device may determine whether a policy is desired for a PRA based on the start time, the end time, and/or the like, included in the PRA data. In some implementations, the PCRF device may obtain data from additional sources in determining whether to associate a policy and/or charging rule with a PRA. For example, the PCRF device may obtain network data (e.g., network congestion data, packet loss data, queuing delay data, and/or the like) from a service provider, one or more network devices, operational support systems, and other sources in determining whether to generate a policy for a PRA. In some implementations, the PCRF device may generate policy and/or charging rules to associate with the PRA. Example rules may include a QoS rule (e.g., a rule that controls how traffic is processed or prioritized), an online charging rule (e.g., a rule that controls whether traffic is to be taken into account when charging a user of the mobile network, and/or the like), and/or the like, to be applied to communications sessions associated with a UE, when the UE is present in a PRA during the predetermined time period. The PCRF device may store the associations between policies and the PRA data in a data structure associated with the PCRF device and/or another device included in the core network.

As an example, the PCRF device may generate a policy rule that adjusts (e.g., reduces and/or throttles) a bandwidth (e.g., a minimum or maximum bandwidth) for a communications session associated with a UE that is present in a PRA during the predetermined time period. As another example, the PCRF device may generate a policy rule that limits a throughput, reduces a bearer priority level, reduces a session priority level, reduces a traffic class (e.g., voice, data, and/or the like) priority level, reduces a bit rate, increases a transit delay, increases a latency, adjusts a residual error, adjusts an error rate, downgrades a QoS, and/or the like, for a communications session associated with UEs present in a PRA during the predetermined time period. In this way, the QoS associated with communications sessions for UEs present in a PRA, during the predetermined time period, may be reduced to proactively prevent network congestion, packet drops, packet losses, overloading network devices, and/or the like. In this way, network resources may be more effectively managed in predetermined locations, during predetermined times.

As further shown by FIG. 1A, and by reference number 108, the PCEF device (e.g., or PGW device) may obtain the PRA data from the PCRF device. In this way, the PCEF device may implement rules that trigger time-based conditional presence reporting, whereby the presence of UEs in a PRA during the predetermined time period may be reported, to the PCRF device. In some implementations, the PCRF device may determine that reports, from the PCEF device regarding the UE presence in the PRA, may be required for an IP-CAN session, and provide the PRA data to the PCEF device by way of a Presence-Reporting-Area-Information AVP (e.g., AVP code 2822). In some implementations, the Presence-Reporting-Area-Information AVP may include one or more newly defined AVP fields, which may correspond to the start time and the end time associated with presence reporting for a PRA. As an example, the PCRF device may transmit the Presence-Reporting-Area-Information AVP, which includes the area identifier (i.e., the Presence-Reporting-Area-Identifier), the PRA status (i.e., the Presence-Reporting-Area-Status), an optional list of elements composing each PRA (e.g., the Presence-Reporting-Area-Elements-List, optional for core-network predefined PRA lists), the PRA start time (e.g., the Presence-Reporting-Area-Start-Time), and the PRA end time (e.g., the Presence-Reporting-Area-End-Time), to the PCEF device. In some implementations, the Presence-Reporting-Area-Information AVP may be transmitted from the PCRF device, to the PCEF device, by way of a Gx interface.

As further shown by FIG. 1A, and by reference number 110, the PCEF device may store the PRA data obtained from the PCRF device, and establish (e.g., install, implement, and/or the like) one or more event-based triggers based on the PRA data. In some implementations, the PCEF device stores the PRA identifier, the start time, and the end time, for use in establishing an event-based trigger for selectively reporting the presence of a UE in a PRA based on comparing a time at which the UE enters or leaves the PRA, and the start time and/or the end time. In some implementations, the events associated with the event-based triggers may correspond to a UE entering a PRA at the start time included in the PRA data, a UE entering a PRA at the end time included in the PRA data, a UE entering the PRA at a time between the start time and the end time, an expiration of the end time, a UE leaving the PRA before expiration of the end time, and/or the like. In some implementations, the events associated with the event-based trigger may trigger a report (e.g., CHANGE_OF_UE_PRESENCE_IN_PRESENCE_REPORTING_AREA_REPORT), to be generated by the PCEF device, to which the PCRF device may subscribe and/or otherwise obtain. In some implementations, changes in the UE's location, which cause the UE to enter and/or leave a PRA during the predetermined time period, may trigger the PCEF device to report the UE's change in location to the PCRF device. In this way, the reporting of a UE as being present in the PRA may be conditioned on time, so that new policies and/or quotas may be selectively obtained and/or applied based on time data, in addition to location data. In this way, changes associated with the QoS levels, charging rules, quota adjustments, and/or the like, for a communications session associated with a UE located in a PRA, may be affected during the predetermined time period, and remain unaffected outside of the predetermined time period. In this way, network resources that would otherwise be wasted on enforcing policies outside of the predetermined time period may be reduced and/or conserved. In this way, energy resources (e.g., electrical power grid resources) used to power network resources that would otherwise be wasted on enforcing policies outside of the predetermined time period may be reduced and/or conserved.

Figure 1B:
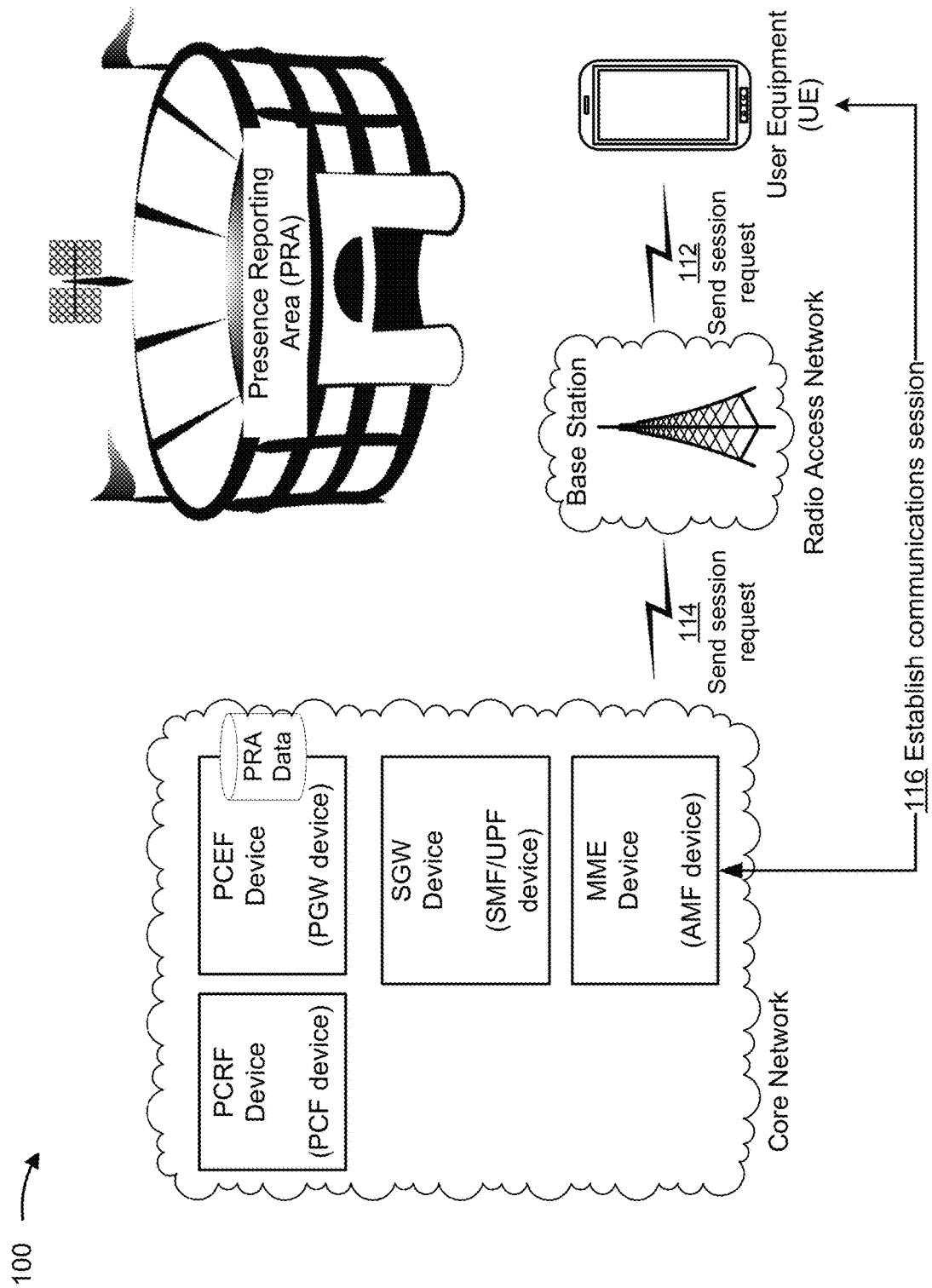

Turning now to FIG. 1B, and as shown by reference number 112, the UE may initiate or request establishment of a communications session with a mobile network by way of sending a session request to a base station. In some implementations, the UE may communicatively connect to the base station, so that the base station may serve the UE during a communications session. As the UE traverses the mobile network, the session may be handed over from one base station to another base station, while maintaining continuity of the session.

As further shown by FIG. 1A, and by reference number 114, the base station may communicate the session request to a network device in the core network, to communicatively connect, or attach, the UE to the core network, whereby an IP-CAN session may be initiated, authenticated, and/or otherwise established. In some implementations, the base station may communicate the session request to the MME device (e.g., or AMF device), whereby the communications session may be created upon the MME device selecting a SGW device to provide the UE access to one or more networks communicatively connected to the mobile network.

As further shown by FIG. 1A, and by reference number 116, one or more communications sessions associated with the UE device may be established. In this way, data may be communicated by or between the UE and one or more other devices (e.g., a server device, another UE, and/or the like), during the communications sessions, by way of the network connection. During the session setup, the MME device may obtain the PRA data from the PCEF device, and report the presence of the UE entering and/or leaving the PRA.

Figure 1C:
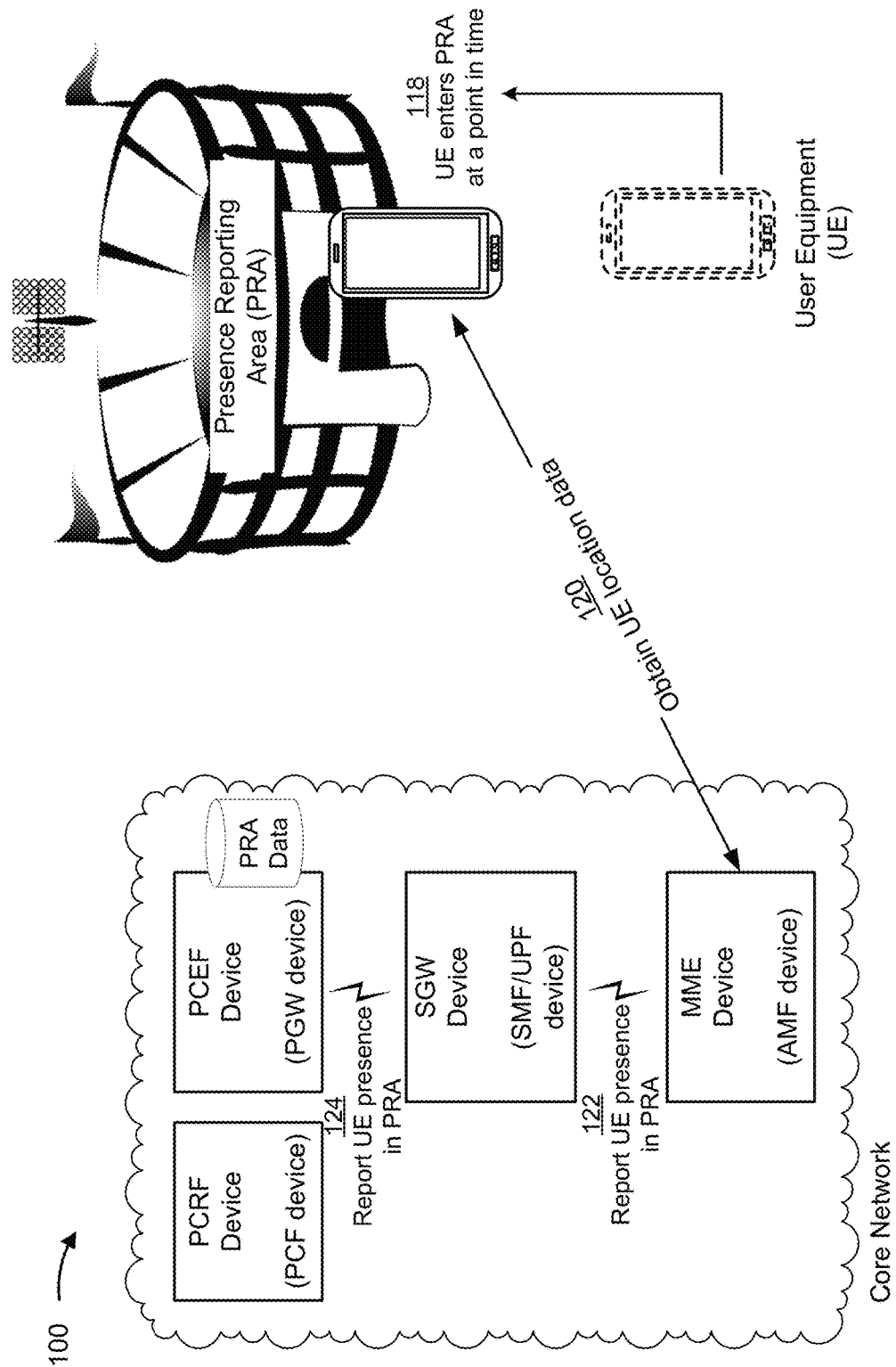

Turning now to FIG. 1C, and as shown by reference number 118, the UE may enter a PRA. In some implementations, the PRA may be identified by way of an area identifier, as described herein. For example, the PRA may correspond to a stadium defined by one or more area identifiers, such as one or more cell identifiers, one or more base station identifiers, a TAI, a RAI, a LAI, a SAI, a SSID, a MAC address, and/or the like.

As further shown in FIG. 1C, and by reference number 120, the MME device may obtain location data associated with the UE, upon the UE entering the PRA. In some implementations, the location data may include a UE identifier, a location identifier, a timestamp, and/or the like, associated with the UE entering the PRA. In some implementations, the location identifier may include a cell identifier, a base station identifier, a TAI, a RAI, a LAI, a SAI, a SSID, a MAC address, and/or the like. In some implementations, the MME device may obtain the location data associated with the UE entering the PRA by way of receiving a tracking area update message from UE. In this way, the UE may initiate a procedure to trigger the reporting of location data for the UE, upon the occurrence of an event (e.g., entering a PRA, leaving a PRA, a handover event, and/or the like). Based on the trigger initiated by the UE, the MME device may be caused to report the presence of the UE in the PRA to the PCEF device. For example, the MME device may compare the location identifier obtained for the UE in the tracking area update message and area identifiers associated with the PRA and report the presence of the UE in the PRA, to the PCEF device, based on a result of the comparison. The timestamp and/or other time data may be included in the presence report communicated from the MME device to the PCEF device, so that the PCEF device may determine whether to report the presence of the UE in the PRA to the PCRF device, based on the time data.

As further shown in FIG. 1C, and by reference number 122, the MME may report the presence of the UE in the PRA to the SGW device, which may in turn relay the presence of the UE in the PRA to the PCEF device, as shown by reference number 124. In some implementations, the presence of the UE in the PRA may be communicated to the SGW device (e.g., or SMF/UPF device) by way of an S11 signaling interface between the MME device and the SGW device. In some implementations, the presence of the UE in the PRA may be communicated to the PCEF device by way of an S5 or S8 signaling interface between the SGW device and the PCEF device. In some implementations, the time at which the UE is present in the PRA may be reported, by the MME device, to the SGW device and the PCEF device. For example, the MME device may transmit the timestamp data, or other time data (e.g., data associated with the actual or approximate time at which UE enters the PRA, leaves the PRA, and/or the like), associated with the UE's presence in the PRA to the SGW device and the PCEF device.

Figure 1D:
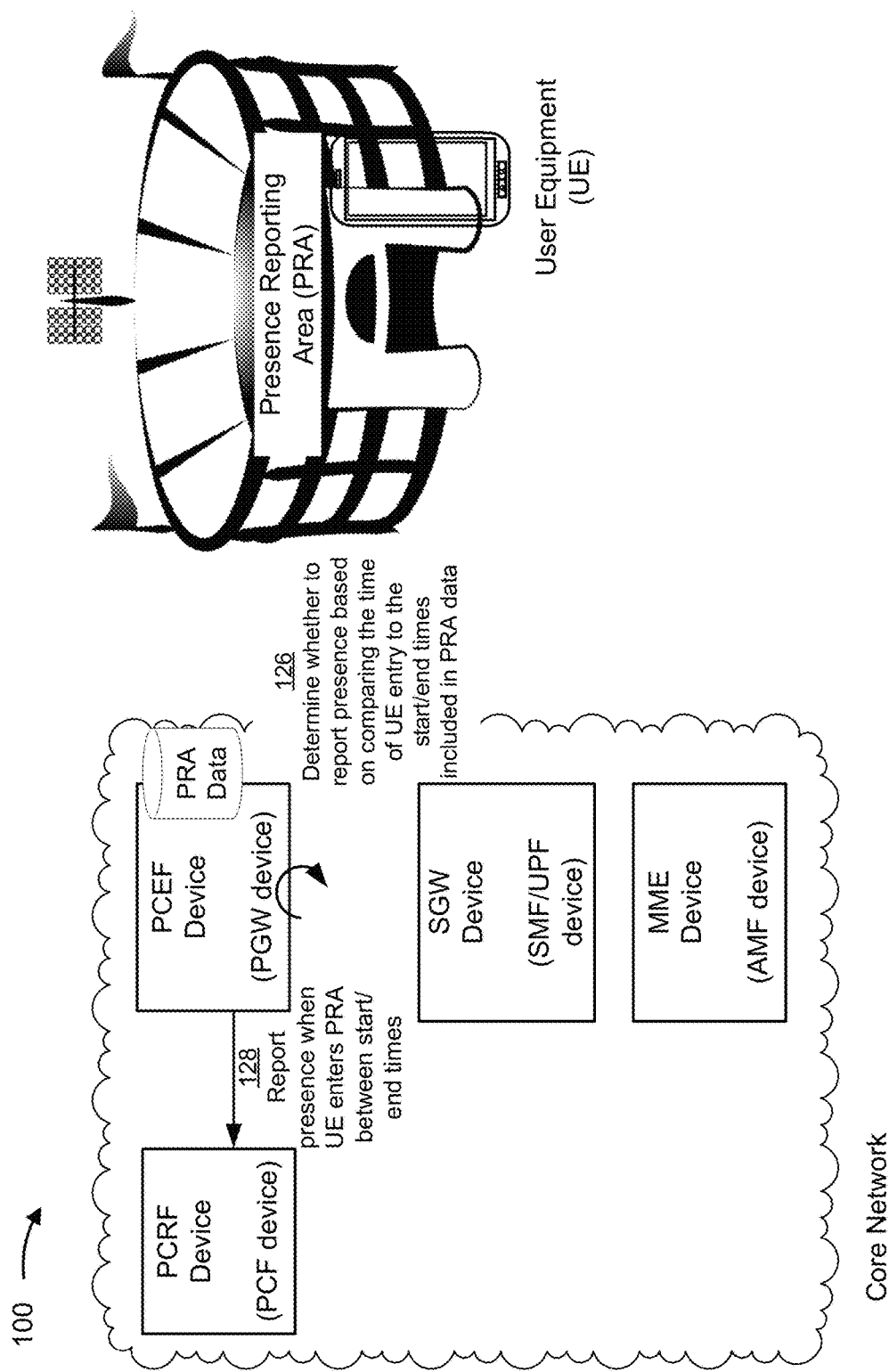

Turning now to FIG. 1D, and as shown by reference number 126, the PCEF device may determine whether to report the presence of the UE in the PRA, based on comparing the location data (e.g., the location identifier, the timestamp data, and/or the like) associated with the UE, and the PRA data stored by the PCEF device. For example, the PCEF device may compare the timestamp data associated with the UE entering the PRA, and the start time, the end time, and/or the like. Where the timestamp data is equal to the start time, equal to the end time, and/or equal to a time occurring between the start time and the end time, the PCEF device may be caused to trigger reporting of the presence of the UE in the PRA, to the PCRF device. In some implementations, the PCEF device may be caused to generate a report based on the UE's presence in the PRA, during the predetermined time period (e.g., the previously described CHANGE_OF_UE_PRESENCE_IN_PRESENCE_REPORTING_AREA_REPORT), to which the PCRF device may subscribe to receive.

As further shown in FIG. 1D, by reference number 128, the PCEF device may report the presence of the UE in the PRA, when the UE enters the PRA at or between the start time and the end time. In this way, reporting the presence of the UE in the PRA, may be time-based and location-based, which may reduce or conserve signaling resources that would otherwise be wasted in reporting the presence of the UE in the PRA automatically, based on location alone.

Figure 1E:
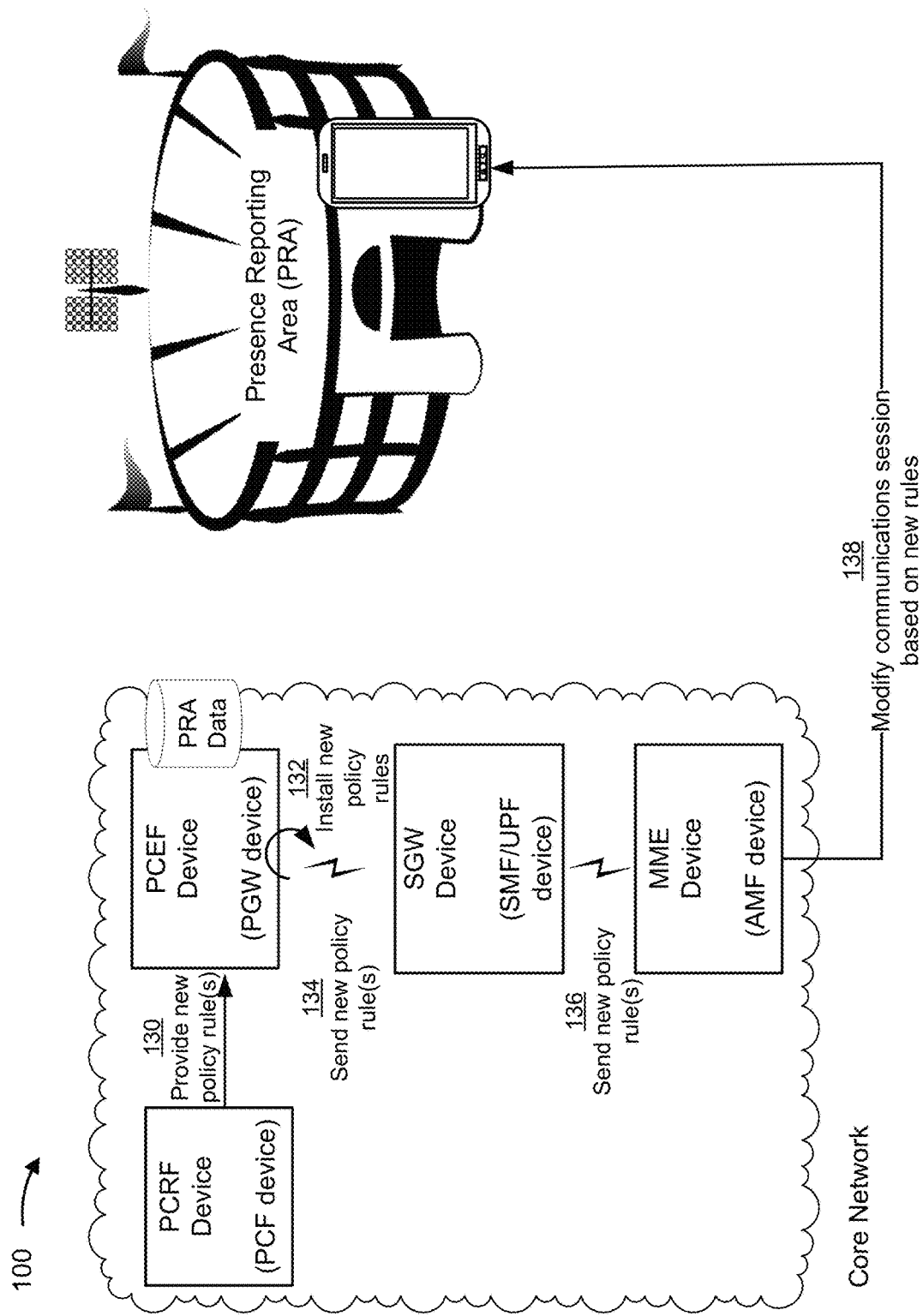

Turning now to FIG. 1E, and as shown by reference number 130, the PCRF device may provide one or more new policy and/or charging rules to the PCEF device, based on receiving the presence report from the PCEF device. The one or more new policy and/or charging rules may be configured to decrease a bit rate for the communications sessions associated with the UE present in the PRA during the predetermined time period, decrease a quota allocation for the communications sessions associated with the UE present in the PRA during the predetermined time period, decrease a priority level for packets transmitted during the communications sessions associated with the UE present in the PRA during the predetermined time period, and/or the like. In some implementations, the QoS levels associated with communications sessions for UEs present in the PRA, during the predetermined time period, may be reduced in an effort to conserve network resources in the PRA, and more effectively manage the network resources, during the predetermined time period, to prevent network congestion, lost packets, dropped packets, and/or the like.

As further shown in FIG. 1E, by reference number 132, the PCEF device may install the one or more new policy and/or charging rules received from the PCRF device, for providing policy enforcement. In some implementations, the PCRF device may obtain and install the one or more new policy and/or charging rules so that the PCEF device may apply the one or more new policy and/or charging rules to communications sessions for the UE located in the PRA during the predetermined time period. In some implementations, the PCRF device may provide the one or more policy and/or charging rules to the PCEF device so that the PCEF device may apply the one or more policy and/or charging rules to the communications sessions associated with the UE.

As further shown in FIG. 1E, by reference number 134, the one or more new policy and/or charging rules may be relayed to the SGW device and, as shown by reference number 136, be relayed to the MME device, for bearer modification. As shown by reference number 138, the communications sessions associated with the UE present in the PRA, during the predetermined time period, may be modified based on the one or more new policy and/or charging rules communicated, implemented, and/or otherwise enforced by the PCEF device.

Figure 1F:
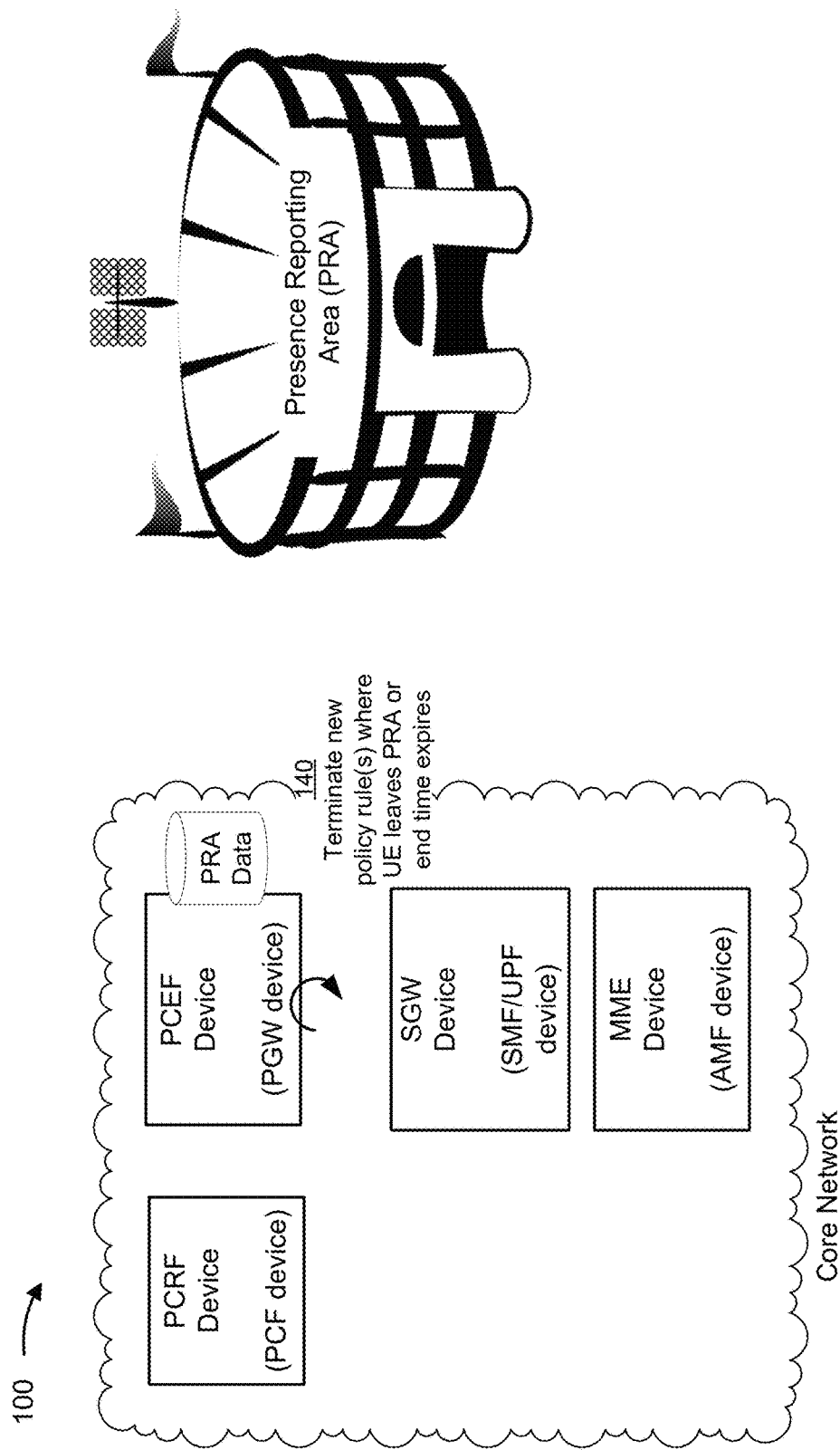

Turning now to FIG. 1F, and as shown by reference number 140, the PCEF device may terminate the one or more new policy and/or charging rules upon the occurrence of an event. Such an event may include, for example, expiration of the end time specified in the PRA data, the UE leaving the PRA prior to expiration of the end time, and/or the like. Upon expiration of the end time, the PCEF device may erase the PRA data from a data structure, or storage component. In this way, memory resources associated with the PCEF device may be conserved.

In this way, the PCEF device may establish event-based triggers for selective reporting of a UE's presence in a PRA, and application of location and time-based policies. In this way, network resources that would otherwise be wasted in reporting, to the PCRF device, the UE's presence in a PRA outside of the predetermined start and end times may be reduced, minimized, and/or conserved. Further, in this way, computing resources that would otherwise be wasted in automatically installing and applying policies based on the mere presence of a UE in a PRA may be reduced, minimized, and/or conserved. Moreover, in this way, policy and/or charging rules may be applied differently in different PRAs in a mobile network, which allows the mobile network to accommodate different and/or changing conditions, which in turn allows the mobile network to more efficiently use available network resources as well as customize and optimize coverage and capacity in the mobile network.

As indicated above, FIGS. 1A-1F are provided merely as an example. Other examples are possible, and may differ from what was described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIG. 1A-1F may be implemented within a single device, or a single device shown in FIG. 1A-1F may be implemented as multiple, distributed devices. Additionally, or alternatively, a set of devices (e.g., one or more devices) of implementation 100 may perform one or more functions described as being performed by another set of devices of implementation 100.

Figure 2A:
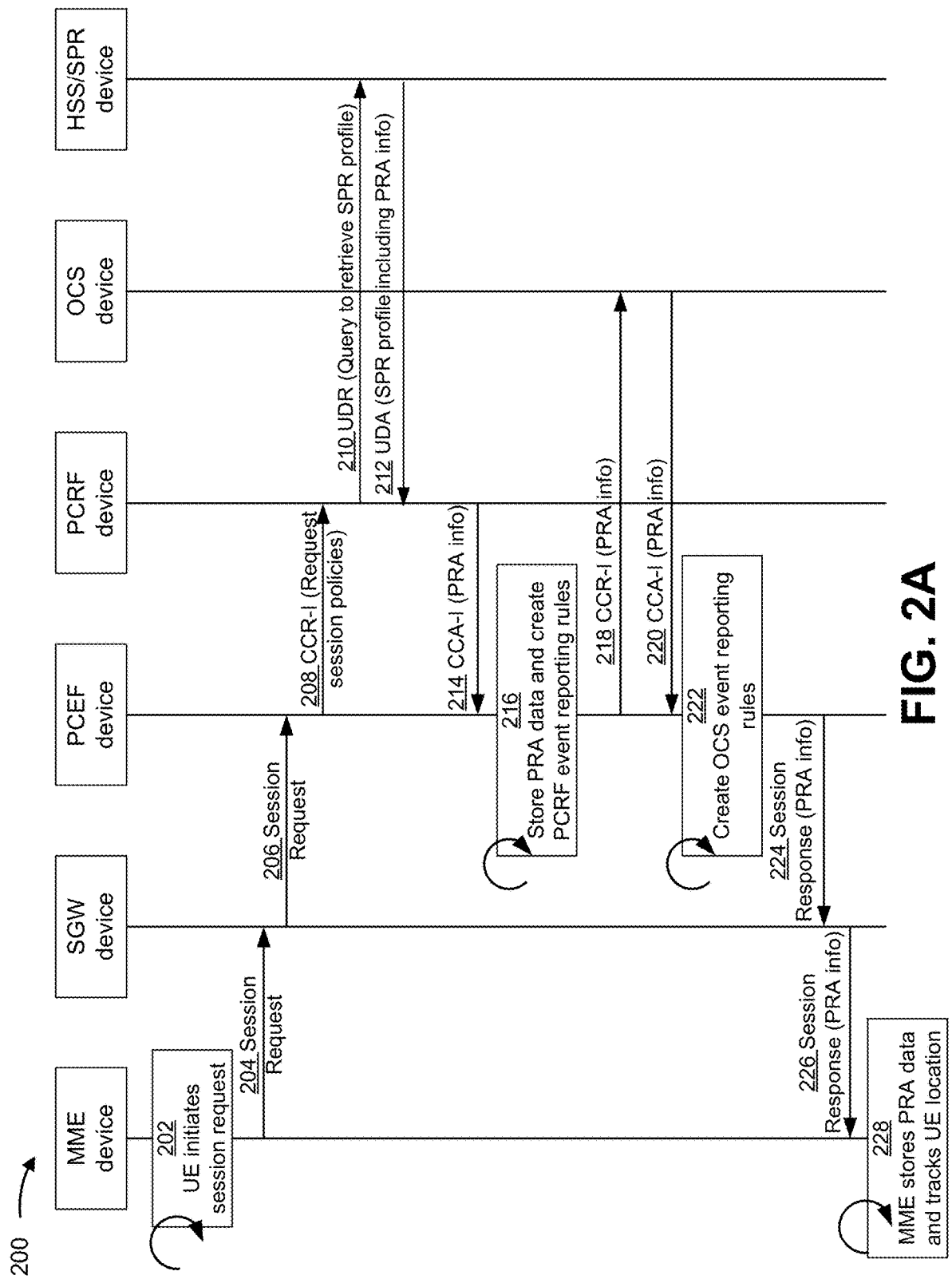
FIGS. 2A-2B are diagrams of a call flow associated with an example implementation capable of being performed by one or more devices described herein.
Figure 2B:
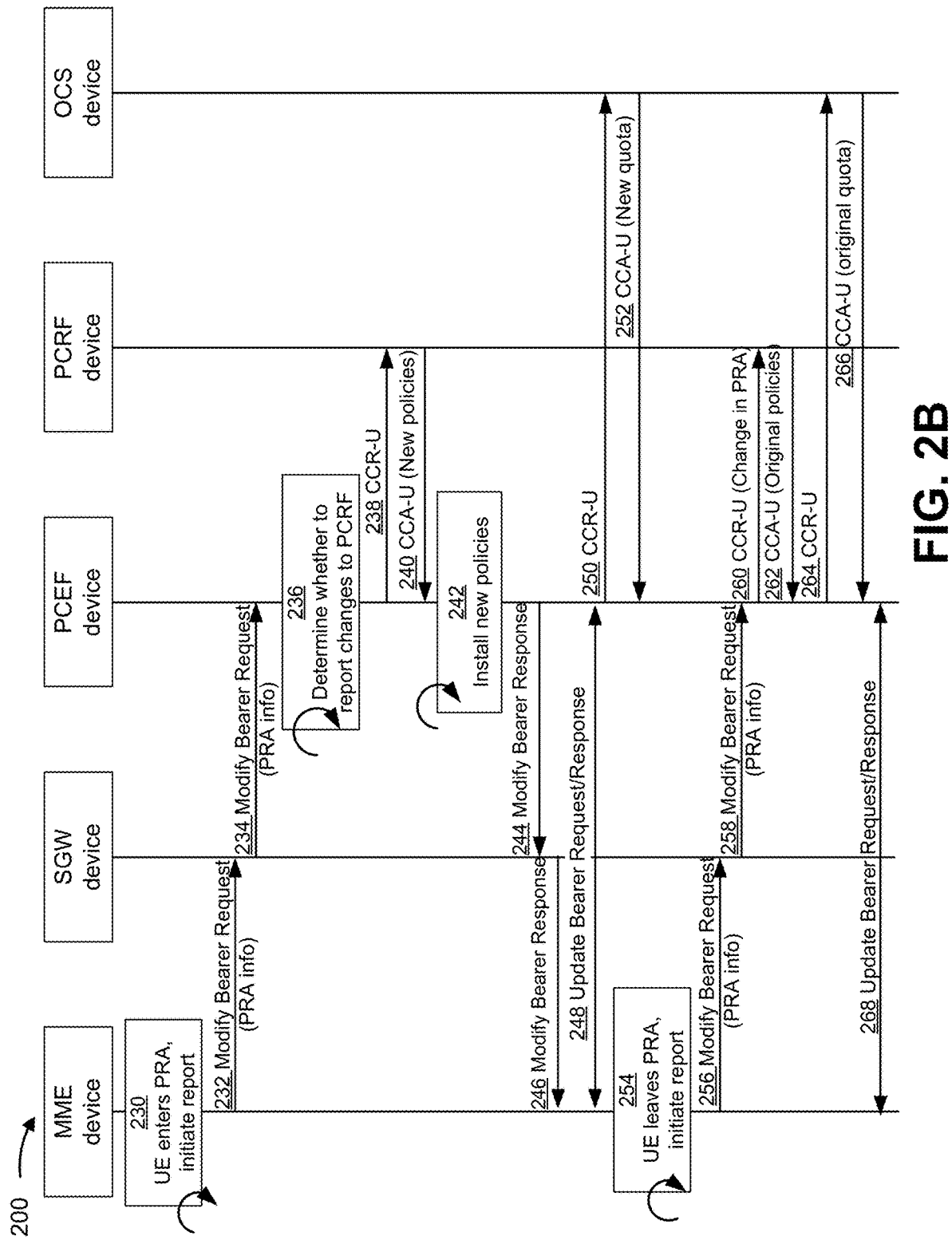

FIGS. 2A-2B are diagrams of a call flow associated with an example implementation 200 capable of being performed by one or more devices described herein. The call flow may indicate signaling between a MME device, a SGW device, a PCEF device, a PCRF device, an OCS device, and/or an HSS/SPR device, for implementing conditional time-based presence reporting.

Referring to FIG. 2A, and at 202, a UE may initiate a session request with the MME device, whereby the UE may attach to a core network for establishing a network connection and initiating an IP-CAN session setup. At 204, the MME device may create the session request, and communicate the session request to the SGW device, which may, at 206, select a PCEF device and relay the session request to the PCEF device for obtaining one or more session policies.

At 208, the PCEF device may request session policies for the session associated with the UE, by sending an initial CCR-I message to the PCRF device. At 210 and 212, the PCRF device may obtain data associated with the UE, including the UE's SPR profile, by way of exchanging UDR/UDA commands, with the HSS/SPR device. In some implementations, the PCRF may obtain the PRA data to be monitored for the UE from the HSS/SPR device by way of exchanging the UDR/UDA commands. In some implementations, the PRA data may include a PRA identifier, a start time, and an end time to be monitored for the UE. In some implementations, the PRA data may include multiple PRA identifiers, multiple start times, and multiple end times to be monitored for the UE.

At 214, the PCRF device may respond to the CCR-I request from the PCEF device by way of communicating a CCA-I message. In some implementations, the CCA-I message may include the PRA data communicated by way of a PRA-install AVP, which may include the one or more PRA identifiers, start times, and/or end times to be monitored for the UE. The PRA-install AVP may include the Presence-Reporting-Area-Information described above (e.g., the Presence-Reporting-Area-Identifier, the Presence-Reporting-Area-Status, the Presence-Reporting-Area-Start-Time, and/or the Presence-Reporting-Area-End-Time). In this way, additional AVPs (i.e., the Presence-Reporting-Area-Start-Time, and the Presence-Reporting-Area-End-Time) may be introduced to the Presence-Reporting-Area-Information AVP, by which time-based presence reporting may be implemented.

At 216, the PCEF device may store the PRA data, including the PRA identifiers, start times, and/or end times, in a data structure of and/or accessible to the PCEF device. The PCEF device may create one or more event reporting rules (e.g., event-based triggers), whereby the PCEF device may be caused to report the presence of a UE entering and/or leaving a PRA, to the PCRF device, based on the UE entering and/or leaving the PRA at a time at or between the start time and the end time.

At 218, the PCEF device may optionally request quota data for the session from the OCS device by way of sending a CCR-I request to the OCS device. The CCR-I request may optionally include the PRA data, for use in generating UE-specific quota profiles, that include UE-specific quota values (e.g., including usage or consumption values such as a data volume limit (e.g., in MB), an active session time limit, an upstream volume limit (bytes), a downstream limit (bytes), a volume threshold %, and/or the like), to be applied to a session upon the UE entering the PRA during the predetermined time period. In some implementations, the OCS device may create the UE-specific quota profiles for the UE, based on the PRA data, for scenarios involving UE-dedicated PRA lists described above. In this way, the PCEF device may dynamically obtain the UE-specific quota profiles, from the OCS device, for adjusting (e.g., lowering, reducing, and/or the like) a quota allocation for the session upon the UE entering the PRA during the predetermined time period.

At 220, the OCS device may respond to the PCRF device by way of a CCA-I message, which includes the PRA data used to establish an event-based reporting rule. At 222, the PCEF device may create one or more event reporting rules (e.g., event-based triggers), whereby the PCEF device may be caused to report the presence of a UE entering and/or leaving a PRA, to the OCS device, based on the UE entering and/or leaving the PRA at a time at or between the start time and the end time. In some implementations, the PCRF device and/or the OCS device may subscribe to receive reports indicating changes in the UE's location.

At 224, the PCEF may send a session response (e.g., in response to the session request at 206), to the SGW device, which may be relayed to the MME device at 226. In some implementations, the session response may include the PRA data. In this way, the MME may be caused to report, to the PCEF device, the UE's presence in a PRA based on tracking the location of the UE device (e.g., using tracking area updates, and/or the like, as described above). At 228, the MME may store the PRA data and start tracking UE location data, whereby the MME may be caused to report, to the PCEF device, instances of the UE entering and/or leaving a PRA.

Continuing with implementation 200, and referring to FIG. 2B, at 230, the MME device may determine that the UE has entered a PRA, and generate and send a report towards the PCEF device. At 232, the MME may send a request to modify a bearer based on determining that the UE has entered the PRA. The request may include PRA data and/or location data associated with the UE, which may include the UE location (e.g., corresponding to the PRA identifier), the PRA identifier associated with the PRA that the UE entered, and/or time data associated with the UE entering the PRA. At 234, the SGW device may relay the request, the PRA data, and/or the location data for the UE, to the PCEF device.

At 236, the PCEF device may determine whether to report the changes in the UE's location, specifically whether to report the UE entering the PRA, to the PCRF device and/or the OCS device, based on comparing the time data associated with the change in the UE's location and the PRA data stored by the PCEF device. For example, the PCEF device may compare the time data at which the UE enters the PRA and the start time and/or the end time. Where the time data is associated with a time occurring at or between the start time and the end time, the PCEF device may be caused to generate a presence report indicating the change in the UE's location to an area within the PRA. The report may be transmitted towards the PCRF device and/or the OCS device.

At 238, the PCEF device may communicate a CCR-U message to the PCRF device, whereby the presence of the UE in the PRA may be reported. In this case, the PCRF may have determined that the time data at which the UE entered the PRA corresponded to the start time, the end time, and/or a time between the start time and the end time.

At 240, the PCRF device may communicate, to the PCEF device, new policies to be applied to the session associated with the UE. In some implementations, the new policies may lower a QoS parameter (e.g., lowering a maximum bit rate, lowering an aggregate maximum bit rate, and/or the like) for the session, adjust a priority level for packets in the session, adjust a charging rule for the session, and/or the like. In this way, network resources associated with communicating traffic to UEs located in the PRA may be more effectively managed, and/or optimized, to prevent network congestion and/or excessive packet losses or delays.

At 242, the PCEF device may install the new polices received from the PCRF device, and begin enforcing the new policies. At 244, the PCEF device may send a modify bearer response message, to the SGW device, in response to the modify bearer request (e.g., at 234) received from the SGW device. In this way, the PCEF device may cause the new policies may be applied to the session associated with the UE by way of sending a bearer update. At 246, the SGW device may relay the new policies to the MME by way of transmitting the modify bearer response. The MME may forward the request to the base station serving the UE and/or communicate the request to the UE.

At 248, the MME device and the SGW device may optionally communicate an update bearer request, to the PCEF device, to receive updated quota limits for the session. At 250, the PCEF device may optionally notify the OCS device that the UE has entered the PRA by way of sending a CCR-U message to the OCS device. At 252, the OCS device may send one or more new quota limits to apply to a session associated with the UE, by way of a CCA-U message, which causes the PCEF device to enforce and/or apply the new quota limits to the session. The new quota limits may reduce a usage volume (e.g., a volume quota), reduce a usage time (e.g., a time quota), and/or the like.

At 254, the MME device may determine that the UE as left the PRA, and generate and send a report reporting the change towards the PCEF device. At 256, the MME may send a request to modify a bearer based on determining that the UE has left the PRA. The request may include PRA data and/or location data associated with the UE, which may include the UE location (e.g., corresponding to the PRA identifier), the PRA identifier associated with the PRA that the UE left, and/or time data associated with the UE leaving the PRA. At 258, the SGW device may relay the request, the PRA data, and/or the location data for the UE, to the PCEF device.

At 260, the PCEF device may determine that the UE has left the PRA prior to expiration of the end time, and report the change in presence of the UE to the PCRF device by way of a CCR-U message. At 262, the PCRF device may communicate the original policies to the PCEF device by way of a CCA-U message. In this way, the PCEF device may be caused to apply and enforce the original policies to the sessions associated with the UE. In this way, the UE's service may be affected while the UE is present in the PRA. The UE's service may revert back to the original QoS parameters, and/or the like, upon the UE leaving the PRA and/or upon expiration of the end time associated with the PRA.

At 264, the PCEF device may optionally report the change in presence of the UE to the OCS device by way of a CCR-U message. At 266, the OCS device may communicate the original quota values or limits to the PCEF device by way of a CCA-U message. In this way, the PCEF device may be caused to apply and enforce the original quota limits. At 268, the PCEF device may communicate an update bearer request message to the SGW device and/or the MME device, causing the policies and/or quota for the session associated with the UE to revert back to the original values. In this way, policies and/or quota may be applied differently, at different times and/or locations, in a mobile network, which allows the mobile network to accommodate different and/or changing conditions, which in turn allows the mobile network to more efficiently use available network resources as well as customize and optimize coverage and capacity in the mobile network.

As indicated above, FIGS. 2A-2B are provided merely as an example. Other examples are possible and can differ from what was described with regard to FIGS. 2A-2B. The number and arrangement of devices and networks shown in FIGS. 2A-2B are provided as an example. In practice, there may be additional devices and/or networks, fewer devices and/or networks, different devices and/or networks, or differently arranged devices and/or networks than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) may perform one or more functions described as being performed by another set of devices of FIGS. 2A-2B.

Figure 3:
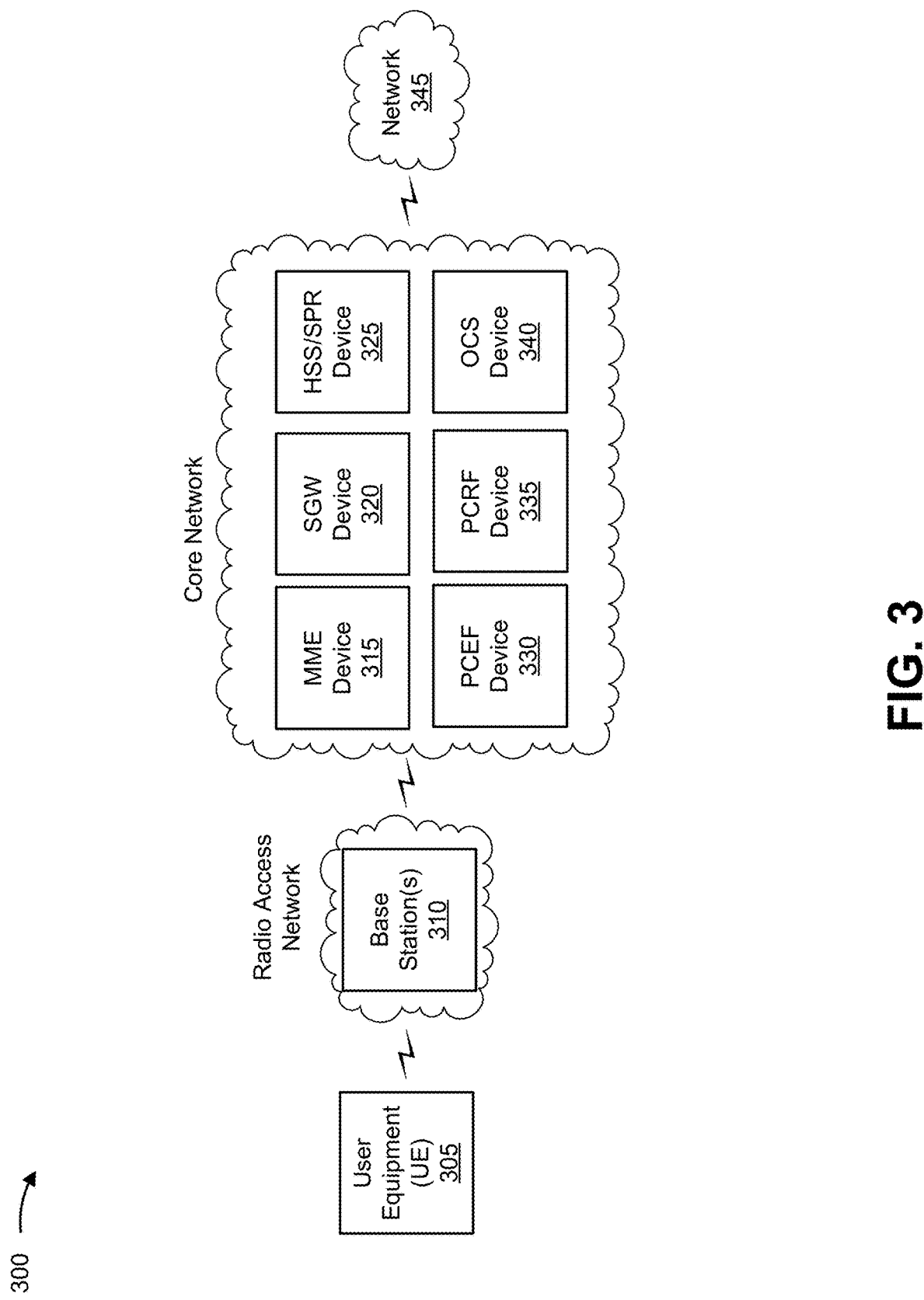
FIG. 3 is a diagram of an example environment in which the devices and/or methods, described herein may be implemented.

FIG. 3 is a diagram of an example environment 300 in which the devices and/or methods, described herein, may be implemented. As shown in FIG. 3, environment 300 may include a UE 305, one or more base stations 310 (individually referred to as "base station 310"), an MME device 315 (e.g., or an AMF device, and/or the like), a SGW device 320 (e.g., or an SMF/UPF device, and/or the like), a HSS/SPR device 325 (e.g., or an AUSF/UDM device, and/or the like), a PCEF device 330 (e.g., or a PGW device, and/or the like), a PCRF device 335 (e.g., or a PCF device, and/or the like), an OCS device 340, and a network 345. Devices of environment 300 may interconnect via wired connections, wireless connections, or a combination of wired and wireless connections. Some implementations may be performed within a 5G network, a 3G network, a 4G network, a long-term evolution (LTE) network, and/or the like.

Environment 300 may include a radio access network (RAN), such as a 5G next generation RAN (NG-RAN, a 3G universal mobile telecommunications system (UMTS) RAN (UTRAN), a LTE evolved UTRAN (E-UTRAN), and/or the like. The RAN may include one or more base stations 310 via which UE 305 communicates with the core network. The core network may include a 5G next generation core network (NG Core), a LTE evolved packet core (EPC), and/or the like. The core network may include MME device 315, SGW device 320, HSS/SPR device 325, PCEF device 330, PCRF device 335, and/or OCS device 340, which enable UE 305 to communicate with network 345.

UE 305 includes one or more devices capable of communicating with base station 310 and/or a network (e.g., network 345). For example, UE 305 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 305 may include a mobile device capable of communicating using uplink (e.g., UE to base station) communications, downlink (e.g., base station to UE) communications, and/or sidelink (e.g., UE-to-UE) communications. In some implementations, UE 305 may include a machine-type communication (MTC) UE, such as an evolved or enhanced MTC (eMTC) UE. In some implementations, UE 305 may include an Internet of Things (IoT) UE, such as a narrowband IoT (NB-IoT) UE and/or the like.

Base station 310 includes one or more devices capable of communicating with UE 305 using a cellular radio access technology. For example, base station 310 may include a base transceiver station, a radio base station, a node B, an evolved node B (eNodeB or eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 310 may transfer traffic between UE 305 and network 345. In some implementations, base station 310 may communicate with UE 305 (and/or one or more other devices) using radio waves.

MME device 315 includes one or more devices, such as one or more server devices, one or more virtualized devices, one or more cloud-computing devices, and/or the like, capable of managing mobility functions, including managing authentication, registration, bearer activation, bearer deactivation, and/or the like, associated with providing UE 305 access to network 345. In some implementations, MME device 315 obtains location (e.g., area) and/or tracking data associated with UE 305, and provides such data to PCEF device 330. In this way, PCEF device 330 may conditionally report presence area data to PCRF device 335 and/or OCS device 340, and obtain updated policies and/or charging rules (e.g., for decreasing QoS, throttling bandwidth, and/or the like) for UE 305, when UE 305 is in a predetermined location (e.g., a PRA) at a predetermined time (e.g., a predetermined start time, a predetermined end time, or a time between the predetermined start and end times).

SGW device 320 includes one or more devices, such as one or more server devices, one or more virtualized devices, one or more cloud-computing devices, and/or the like, capable of routing, forwarding, and/or signaling data packets between MME device 315 and PCEF device 330, while serving as the anchor for mobility during handovers and/or mobility between LTE and other 3GPP technologies.

HSS/SPR device 325 includes one or more devices, such as one or more server devices, one or more virtualized devices, one or more cloud-computing devices, and/or the like, capable of storing, maintaining, and/or updating customer profile data and/or policy data relating to customer profile data. In some implementations, HSS/SPR device 325 includes a data structure configured to store PRA data, and provide such PRA data to PCRF device 335 during an initial setup and/or session establishment between UE 305 and network 345. In turn, PCRF device 335 may generate location and time specific policies that may be triggered and applied whenever UE 305 enters or leaves a PRA during the predetermined time period.

PCEF device 330 includes one or more devices, such as one or more server devices, one or more virtualized devices, one or more cloud-computing devices, and/or the like, capable of receiving, installing, enforcing, and/or implementing policy and/or charging rules generated by PCRF device 335. In some implementations, PCEF device 330 may enforce or apply policy rules received from PCRF device 335 and/or charging authorization for quotas (e.g., usage quotas, such as time quotas, volume quotas, and/or the like) and credit control received from OCS device 340. In some implementations, PCEF device 330 may conditionally report, to PCRF device 335 and/or OCS device 340, a presence of UE 305 in a PRA based on a result of determining whether UE 305 in present in the PRA at an event start time, an event end time, or a time between the event start time and the event end time.

PCRF device 335 includes one or more devices, such as one or more server devices, one or more virtualized devices, one or more cloud-computing devices, and/or the like, capable of generating, maintaining, and/or distributing policy rules. In some implementations, PCRF device 335 may generate, store, and/or provide policy rules (e.g., a traffic steering rule, a QoS rule, and/or the like), to PCEF device 330. For example, PCRF device 335 may provide one or more policy rules, to PCEF device 330, so that PCEF device 330 may apply the one or more policy rules during a session (e.g., an IP-CAN session) associated with UE 305. In some implementations, PCRF device 335 may associate one or more policy rules with a PRA (e.g., identified by an area identifier) and a particular time (e.g., a particular start time, a particular end time, and/or the like). For example, PCRF device 335 may store the associations between policy rules and presence areas and times in a data structure and, when UE 305 is located in a particular PRA during a particular time, may provide one or more policy rules, associated with the particular PRA and the particular time, to PCEF device 330 for enforcement. In some implementations, PCRF device 335 communicates (e.g., transmits, and/or the like) policy rules to PCEF device 330 using a 3GPP Gx protocol and online policy interface.

OCS device 340 includes one or more devices, such as one or more server devices, one or more virtualized devices, one or more cloud-computing devices, and/or the like, capable of generating, maintaining, and/or distributing charging rules and/or quota limits. In some implementations, OCS device 340 may generate, store, and/or provide charging rules (e.g., event-based charging rules, session-based charging rules, and/or the like) to PCEF device 330. For example, OCS device 340 may provide one or more charging rules, to PCEF device 330, so that PCEF device 330 may apply the one or more charging rules during a session associated with UE 305. In some implementations, OCS device 340 may associate one or more charging rules with a particular event, such as UE 305 being disposed in a PRA at a particular time. For example, OCS device 340 may store the associations between charging rules, quota limits, PRAs, and/or start and end times in a data structure and, when UE 305 is located in a particular PRA during a particular time, may provide one or more charging rules and/or quota limits, associated with the particular PRA and the particular time, to PCEF device 330 for enforcement. In some implementations, OCS device 340 may communicate (e.g., transmit, and/or the like) charging rules to PCEF device 330 using a 3GPP Gy protocol and online policy interface.

Network 345 includes one or more wired and/or wireless networks. For example, network 345 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
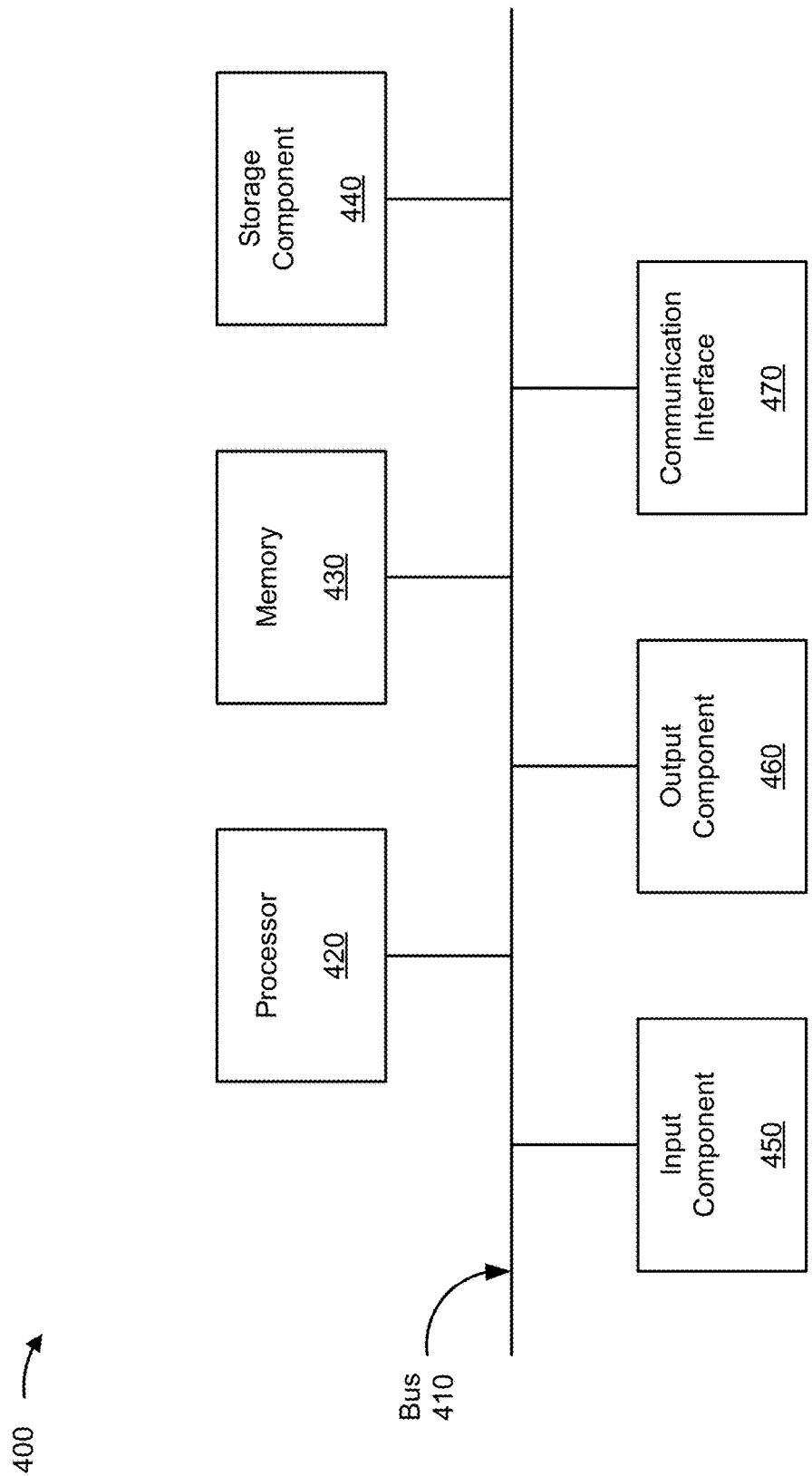
FIG. 4 is a diagram of example components of one or more devices of FIG. 3.

FIG. 4 is a diagram of example components of a device 400. Device 400 may correspond UE 305, base station 310, MME device 315, SGW device 320, HSS/SPR device 325, PCEF device 330, PCRF device 335, and/or OCS device 340. In some implementations, UE 305, base station 310, MME device 315, SGW device 320, HSS/SPR device 325, PCEF device 330, PCRF device 335, and/or OCS device 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 may include a component that permits communication among the components of device 400. Processor 420 is implemented in hardware, firmware, or a combination of hardware and software. Processor 420 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 may include a random access memory (RAM), a read only memory (ROM), and/or another type of dynamic or static storage device (e.g., a flash memory, a magnetic memory, and/or an optical memory) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 may include a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, a clock component, a timer component, an actuator, and/or the like). Output component 460 may include a component that provides output information from device 400 (e.g., a display, a speaker, and/or one or more light-emitting diodes (LEDs)).

Communication interface 470 may include a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
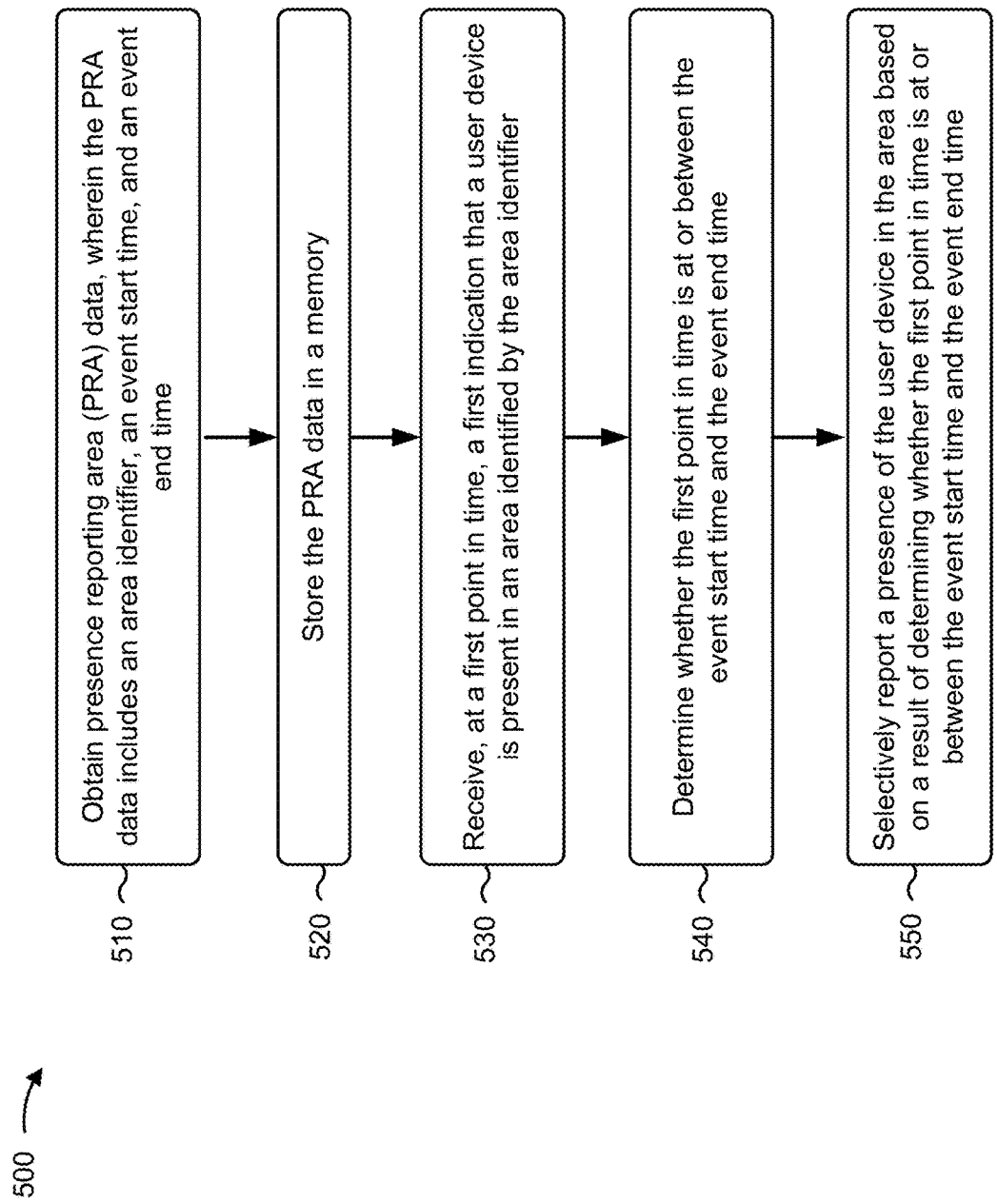
FIG. 5 is a flow chart of an example process for providing time-based conditional presence reporting.

FIG. 5 is a flow chart of an example process 500 for providing time-based conditional presence reporting. In some implementations, one or more process blocks of FIG. 5 may be performed by a PCEF device (e.g., PCEF device 330). In some implementations, one or more process blocks of FIG. 5 may be performed by another device or a group of devices separate from or including the PCEF device (e.g., PCEF device 330), such as a UE (e.g., UE 305), a base station (e.g., base station 310), a MME device (e.g., MME device 315), a SGW device (e.g., SGW device 320), a HSS/SPR device (e.g., HSS/SPR device 325), a PCRF device (e.g., PCRF device 335), and/or an OCS device (e.g., OCS device 340).

As shown in FIG. 5, process 500 may include obtaining PRA data, wherein the PRA data includes an area identifier, an event start time, and an event end time (block 510). For example, the PCEF device 330 (e.g., using processor 420, memory 430, storage component 440, communication interface 470, and/or the like) may store PRA data, as described in FIGS. 1A-1F above. In some implementations, the PRA data includes an area identifier, an event start time, and an event end time.

As further shown in FIG. 5, process 500 may include storing the PRA data in a memory (block 520). For example, the PCEF device 330 (e.g., using processor 420, memory 430, storage component 440, and/or the like) may store the PRA data, as described in FIGS. 1A-1F above.

As further shown in FIG. 5, process 500 may include receiving, at a first point in time, a first indication that a user device is present in an area identified by the area identifier (block 530). For example, the PCEF device 330 (e.g., using input component 450, communication interface 470, and/or the like) may receive, at a first point in time, a first indication that a user device is present in an area identified by the area identifier, as described in FIGS. 1A-1F above.

As further shown in FIG. 5, process 500 may include determining whether the first point in time is at or between the event start time and the event end time (block 540). For example, the PCEF device 330 (e.g., using processor 420, memory 430, storage component 440, communication interface 470, and/or the like) may determine whether the first point in time is at or between the event start time and the event end time, as described in FIGS. 1A-1F above.

As further shown in FIG. 5, process 500 may include selectively reporting a presence of the user device in the area based on a result of determining whether the first point in time is at or between the event start time and the event end time (block 550). For example, the PCEF device 330 (e.g., using processor 420, memory 430, storage component 440, output component 460, communication interface 470, and/or the like) may selectively report a presence of the user device in the area based on a result of determining whether the first point in time is at or between the event start time and the event end time, as described in FIGS. 1A-1F above.

Process 500 may include additional implementations, such as any single implementation or any combination of implementations described below and/or described with regard to any other process described herein.

In some implementations, process 500 may include reporting the presence of the user device in the area when the first point in time is at or between the event start time and the event end time, or not reporting the presence of the user device in the area when the first point in time is not at or between the event start time and the event end time. In some implementations, process 500 may include reporting the presence of the user device in the area when the first point in time is at or between the event start time and the event end time, receiving a new policy or charging rule after reporting the presence of the user device in the area, and applying the new policy or charging rule to a communication session associated with the user device.

In some implementations, process 500 may include detecting an expiration of the event end time, and terminating the new policy or charging rule based on detecting the expiration of the event end time. In some implementations, process 500 may include receiving a second indication that the user device is not present in the area identified by the area identifier at a second point in time, and terminating the new policy or charging rule based on the second indication.

In some implementations, process 500 may include applying a new policy or charging rule that is configured to adjust (e.g., decrease, downgrade, and/or the like) a bit rate for the communication session, adjust a quota allocation for the communication session, or adjust a priority level for packets transmitted during the communication session. In some implementations, process 500 includes storing an area identifier that includes a base station identifier, a cell identifier, or a tracking area identifier.

In some implementations, process 500 may include terminating the new policy or charging rule based on an occurrence of an event, wherein the event may include detecting an expiration of the event end time and/or detecting the user device leaving the area.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it shall be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  obtaining, by a processor of a device, presence reporting area (PRA) data;
    wherein the PRA data includes:
      an area identifier,
      an event start time, and
      an event end time;
  storing, by the processor, the PRA data in a memory of the device;
  receiving, by the processor and at a first point in time, a first indication that a user device is present in an area identified by the area identifier;
  determining, by the processor, whether the first point in time is at or between the event start time and the event end time;
  selectively reporting, by the processor, a presence of the user device in the area based on a result of determining whether the first point in time is at or between the event start time and the event end time;
  reporting, by the processor, the presence of the user device in the area when the first point in time is at or between the event start time and the event end time;
  determining, by the processor, that a quantity of user devices in the PRA satisfies a threshold;
  receiving, by the processor and from a Policy and Charging Rule Function (PCRF), a new policy or charging rule based on reporting the presence of the user device in the area and determining that the quantity of user devices in the PRA satisfies the threshold,
    wherein the new policy or charging rule relates to conditions associated with the presence of the user device in the area when the first point in time is at or between the event start time and the event end time; and applying, by the processor, the new policy or charging rule to a communication session associated with the user device.

2. The method of claim 1, wherein selectively reporting the presence of the user device includes:
reporting, by the processor, the presence of the user device in the area when the first point in time is at or between the event start time and the event end time; or
not reporting, by the processor, the presence of the user device in the area when the first point in time is not at or between the event start time and the event end time.

3. The method of claim 1, further comprising:
detecting, by the processor, an expiration of the event end time; and
terminating, by the processor, the new policy or charging rule based on detecting the expiration of the event end time.

4. The method of claim 1, further comprising:
receiving, by the processor, a second indication that the user device is not present in the area identified by the area identifier at a second point in time; and
terminating, by the processor, the new policy or charging rule based on the second indication.

5. The method of claim 1, wherein the new policy or charging rule is configured to:
decrease a bit rate for the communication session,
adjust a quota allocation for the communication session, or
adjust a priority level for packets transmitted during the communication session.

6. The method of claim 1, wherein the area identifier includes:
a base station identifier,
a cell identifier, or
a tracking area identifier.

7. The method of claim 1, wherein the user device comprises a mobile device and wherein the new policy or charging rule downgrades a quality of service for the mobile device.

8. A device, comprising:
one or more memories; and
one or more processors, operatively coupled to the one or more memories, to:
obtain, from a Policy and Charging Rules Function (PCRF), presence reporting area (PRA) data;
store, by the one or more processors in the one or more memories, the PRA data,
wherein the PRA data includes:
an area identifier,
an event start time, and
an event end time;
receive, by the one or more processors, at a first point in time, a first indication that a user device is present in an area identified by the area identifier;
determine, by the one or more processors, that the first point in time is at or between the event start time and the event end time;
report, by the one or more processors, a presence of the user device in the area based on a result of determining that the first point in time is at or between the event start time and the event end time;
determine, by the one or more processors, that a quantity of user devices in the PRA satisfies a threshold;
receive, by the one or more processors and from the PCRF, a new policy or charging rule based on reporting the presence of the user device in the area and determining that the quantity of user devices in the PRA satisfies the threshold,
wherein the new policy or charging rule relates to conditions associated with the presence of the user device in the area when the first point in time is at or between the event start time and the event end time; and
apply, by the one or more processors, the new policy or charging rule to a communication session associated with the user device.

9. The device of claim 8, wherein the device comprises a Policy and Charging Enforcement Function (PCEF).

10. The device of claim 8, wherein the user device comprises a mobile device and the new policy or charging rule downgrades a quality of service for the mobile device.

11. The device of claim 8, wherein the one or more processors are further to:
detect an expiration of the event end time; and
terminate the new policy or charging rule based on the expiration.

12. The device of claim 8, wherein the one or more processors are further to:
receive a second indication that the user device is not present in the area identified by the area identifier at a second point in time; and
terminate the new policy or charging rule based on the second indication.

13. The device of claim 8, wherein the new policy or charging rule is configured to:
adjust a bit rate for the communication session,
adjust a quota allocation for the communication session, or
adjust a priority level for packets transmitted during the communication session.

14. The device of claim 8, wherein the area identifier includes:
a base station identifier,
a cell identifier, or
a tracking area identifier.

15. A non-transitory computer-readable medium storing one or more instructions, the one or more instructions comprising:
one or more instructions that, when executed by one or more processors, cause the one or more processors to:
obtain presence reporting area (PRA) data;
store the PRA data in a memory,
wherein the PRA data includes:
an area identifier,
an event start time, and
an event end time;
receive, at a first point in time, a first indication that a user device is present in an area identified by the area identifier;
determine that the first point in time is at or between the event start time and the event end time;
report a presence of the user device in the area based on a result of determining that the first point in time is at or between the event start time and the event end time;
determine that a quantity of user devices in the PRA satisfies a threshold;
receive a new policy or charging rule based on reporting the presence of the user device in the area and determining that the quantity of user devices in the PRA satisfies the threshold,
wherein the new policy or charging rule relates to conditions associated with the presence of the user device in the area when the first point in time is at or between the event start time and the event end time;

apply the new policy or charging rule to a communication session associated with the user device; and terminate the new policy or charging rule based on an occurrence of an event.

16. The non-transitory computer-readable medium of claim 15, wherein the event includes expiration of the event end time.

17. The non-transitory computer-readable medium of claim 15, wherein the event includes the user device leaving the area.

18. The non-transitory computer-readable medium of claim 15, wherein the area identifier includes:
   a base station identifier,
   a cell identifier, or
   a tracking area identifier.

19. The non-transitory computer-readable medium of claim 15, wherein the new policy or charging rule is configured to:
   decrease a bit rate for the communication session,
   decrease a quota allocation for the communication session, or
   decrease a priority level for packets transmitted during the communication session.

20. The non-transitory computer-readable medium of claim 15, wherein the user device comprises a mobile device and wherein the new policy or charging rule downgrades a quality of service for the mobile device.

* * * * *